United States Patent
Nakazawa et al.

(10) Patent No.: US 6,333,942 B1
(45) Date of Patent: *Dec. 25, 2001

(54) ATOMIC FREQUENCY STANDARD LASER PULSE OSCILLATOR

(75) Inventors: Masataka Nakazawa, Mito; Eiji Yoshida, Yokosuka, both of (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,181

(22) Filed: Dec. 14, 1999

(30) Foreign Application Priority Data

Dec. 17, 1998 (JP) .................................................. 10-358831

(51) Int. Cl.$^7$ ................................. H01S 3/10; H01S 3/00; H01S 3/098

(52) U.S. Cl. ..................... 372/25; 372/26; 372/38.02; 372/38.07; 372/18; 372/9

(58) Field of Search ................................. 372/38.1, 38.02, 372/38.07, 9, 18, 19, 29.01, 25.26

(56) References Cited

U.S. PATENT DOCUMENTS

| | | | |
|---|---|---|---|
| 4,635,266 | 1/1987 | Facklam | 372/32 |
| 4,661,782 | * 4/1987 | Weidemann | 331/3 |
| 5,101,103 | * 3/1992 | Johnson et al. | 250/251 |
| 5,796,272 | * 8/1998 | Yazaki | 327/41 |
| 5,838,475 | * 11/1998 | Takeyari et al. | 359/176 |
| 5,926,492 | * 7/1999 | Yoshida et al. | 372/6 |
| 6,204,944 | * 3/2001 | Uchiyama et al. | 359/123 |

FOREIGN PATENT DOCUMENTS

| | | | |
|---|---|---|---|
| 0 351 782 A2 | 1/1990 | (EP) | H03L/7/26 |
| 5-110434 | 4/1993 | (JP) . | |
| 08018139 | 1/1996 | (JP) . | |
| 08340154 | 12/1996 | (JP) . | |
| 10-74999 | 3/1998 | (JP) . | |

* cited by examiner

Primary Examiner—Teresa M. Arroyo
Assistant Examiner—James Menefee
(74) Attorney, Agent, or Firm—Venable; Robert J. Frank; Ashley J. Wells

(57) ABSTRACT

An ultra-stable microwave output with less jitter than a prior art atomic oscillator is obtained and an ultra-short optical pulse train is generated with a repetition frequency stabilized at the same level as a time standard. The repetition frequency of a regeneratively mode-locked laser pulse oscillator with a superior low-jitter characteristic is locked directly to a resonance frequency of various atoms. The oscillator provides the means for detecting the frequency difference between the clock signal frequency and a predetermined atomic resonance frequency and outputting it as an error signal, a cavity length tuning device for varying the length of a laser cavity so that the clock signal frequency and the predetermined resonance frequency coincide, and a device for negatively feeding back the error signal output from the frequency difference detection device to the cavity length tuning device. This allows the generation of an optical pulse train (optical output) and a clock signal (microwave output) of a repetition frequency stabilized to the predetermined atomic resonance frequency.

8 Claims, 7 Drawing Sheets

ATOMIC FREQUENCY STANDARD LASER PULSE OSCILLATOR

This application is based on patent application Ser. No. 10-358831 (1998) filed Dec. 17, 1998 in Japan, the content of which is incorporated hereinto by reference.

BACKGROUND OF THE INVENTION

FIELD OF THE INVENTION

The present invention relates to an atomic frequency standard laser pulse oscillator which can generate an ultrashort optical pulse train with a precise repetition frequency which is stabilized at a higher level than that of a time standard obtained by a conventional atomic oscillator.

DESCRIPTION OF THE PRIOR ART

FIG. 3 is a diagram showing the structure of a laser pulse oscillator described in Japanese Patent Application Laid-open No. 8-18139 (1996).

In FIG. 3, reference numeral 1 indicates an optical fiber doped with rare-earth ions (hereinafter referred to as "rare-earth ion doped optical fiber"), 2 is a pumping optical source for generating pump light for the rare earth ion doped optical fiber, 3 is an optical coupler for coupling the pump light to the rare-earth ion doped optical fiber 1, 4 is an optical beam splitter for extracting a laser output, 5 is an optical isolator for limiting the light propagation to a single direction, 6 is an optical modulator, and 7 is an optical filter. 1, 3, 4, 5, 6 and 7 are coupled in a ring configuration to construct a ring laser cavity. The laser output split by the optical beam splitter 4 is divided again with an optical beam splitter 8 into an optical output terminal and the driver of the optical modulator 6. The driver of the optical modulator 6 comprises a clock extraction circuit 9, a phase shifter 10, and a microwave electrical amplifier 11.

The operation mechanism of this laser pulse oscillator, which has an optical pulse train with a high repetition rate, is as follows. When the pump light output from the pumping optical source 2 is coupled into the rare-earth ion doped optical fiber 1 through the optical coupler 3, continuous wave oscillation occurs in the propagation direction of the optical isolator 5 through the bandwidth of the optical filter 7. This laser output is extracted through the optical beam splitter 4, and part thereof is input through the optical beam splitter 8 to the clock extraction circuit 9 comprising a photo detector, a narrow-band electrical filter and an electrical amplifier. Thus, a sinusoidal wave clock signal is extracted with this clock extraction circuit 9, and the phase timing of the clock signal is adjusted by the phase shifter 10. After that, the clock signal is amplified by the microwave electrical amplifier 11, and then input into the optical modulator 6. As a result, the light in the laser cavity is intensity-modulated at a frequency that is synchronized with the clock signal.

In general, where L is the cavity length, n the refractive index of optical fiber, and c the speed of light, amplitude modulation of a fundamental frequency $fo=c/(nL)$ determined by L is applied to the laser cavity, and mode locking at a fundamental repetition rate (a single optical pulse in the cavity) is achieved. When a modulation frequency f is set at an integral multiple of fo such that $f=qfo=qc/(nL)$, where q is the integer, harmonically mode-locked oscillation can be achieved at a frequency of q times the fundamental frequency. That is, equally-spaced q optical pulses are produced in the cavity simultaneously, generating an optical pulse train having a repetition frequency of qfo.

A consideration is made for a case where a clock extraction circuit 9 at 10 GHz is used in FIG. 3. Since a clock signal in the vicinity of 10 GHz which does not coincide with an integral multiple of the fundamental frequency fo cannot generate a stable optical pulse train, it eventually disappears. In contrast, when the clock signal coincides with an integral multiple of the fundamental frequency fo, the modulation frequency and the repetition frequency of the optical pulse are completely synchronized, and therefore stable pulse oscillation is gradually enhanced. When this process is repeated, only the clock signal with the integral multiple of the fundamental frequency, which was initially noisy, remains. That is, the optical modulator 6 is driven only by a pure sinusoidal wave clock signal with no spurious longitudinal modes, and stable 10 GHz harmonic mode-locking is achieved. This prior art is referred to as harmonic and regenerative mode-locking.

In the prior art harmonically and regeneratively mode-locked laser pulse oscillator, when the cavity length fluctuates because of a temperature change in the laser cavity, the fundamental frequency fo changes with time (above patent publication). Since the modulation frequency f which is applied to the optical modulator is automatically controlled by the change in the cavity length, the repetition frequency of the generated optical pulse train fluctuates following the change in cavity length. For example, where L=200 m and f=10 GHz, when the temperature in the cavity is changed by 0.01° C., the cavity length L changes by 20 $\mu$m and the repetition frequency changes by 1 KHz. However, the jitter and low-drift characteristics of the harmonically and regeneratively mode-locked laser pulse oscillator have been well investigated, and it is known that, although it has low frequency drift, its high frequency jitter is less severe than that of ordinary electrical synthesizers and is as small as 80 fs at a repetition frequency of 10 GHz. By contrast, the jitter of an ordinary electrical synthesizer is about 200–400 fs.

To stabilize the repetition frequency of the harmonically and regeneratively mode-locked laser pulse oscillator, a phase-locked loop method (PLL method) has been proposed in which the repetition frequency of the laser is controlled by synchronizing it with an external clock signal (Japanese Patent Application Laid-open No. 10-74999 (1998)).

FIG. 4 is a diagram showing the configuration of the prior art laser pulse oscillator described in Japanese Patent Application Laid-open No. 10-74999 (1998). The components newly added to the laser pulse oscillator shown in FIG. 3 are a synthesizer (a standard signal generator) 12, a phase shifter 13, a phase comparator 14, an electrical filter 15, a negative feedback circuit 16, an electrical amplifier 17, and a piezoelectric transducer (PZT) 18.

In FIG. 4, the phase difference between an external signal generated from the synthesizer 12 and the clock signal of a laser pulse oscillator under a free running condition (output of the clock extraction circuit 9) is converted into a voltage error signal by the phase comparator 14 consisting of a double balanced mixer (DBM). This error signal is negatively fed back through the electrical filter 15, the negative feedback circuit 16, and the electrical amplifier 17 to the piezoelectric transducer 18 in the cavity. This operation automatically controls the cavity length so that the repetition frequency of the laser pulse oscillator synchronizes with the external signal, and the repetition frequency is stably locked to the oscillation frequency of the synthesizer 12.

However, the stability of the repetition frequency of the laser pulse oscillator shown in FIG. 4 is limited by the stability of the externally supplied clock signal, that is, the stability of the synthesizer. An optical pulse train with an ultra-stable repetition frequency that can be used as a time standard has not heretofore been obtained. However, it is important to note that the high frequency jitter characteristic of the present laser pulse oscillator shown in FIG. 4 is superior to that of the synthesizer. We use this excellent feature in the present invention.

Apart from the laser pulse oscillator, an atomic oscillator has been already proposed in which the oscillation frequency is locked to a resonance frequency of an atom (such as cesium (Cs) or rubidium (Rb)) (ref. Yoshimura, Koga, Oura, "Frequency and time/fundamentals of atomic clock/mechanism of atomic time", Society of Electronic Information Communications).

FIG. 5 is a diagram showing the configuration of a conventional Cs atomic oscillator. In FIG. 5, reference numeral 21 indicates a quartz oscillator, 22 is a phase modulator for the phase sensitive detection, 23 is an oscillator for the phase modulator, 24 is a frequency synthesizer/multiplier, 25 is a Cs atomic beam tube, 26 is an electrical amplifier, 27 is a phase discriminator for the phase sensitive detection of deviations from the resonance frequency of the Cs atom, and 16 is a negative feedback circuit. The oscillator 21, which is the basis of the atomic oscillator incorporates a quartz oscillator and its oscillation frequency is typically 5 MHz. Its output signal is coupled into the phase modulator 22 to be phase modulated, and further multiplied by the frequency synthesizer/multiplier 24 up to a resonance frequency (depending on the atom employed) at several tens of GHz.

The Cs atomic beam tube 25 consists of a Cs beam stream enclosed in a microwave resonant cavity, where the output signal (microwave) of the frequency synthesizer/multiplier 24 is coupled to the tube 25 to undergo resonance. In this case, to detect a frequency deviation from the Cs resonance line, a resonance line called a Ramsey resonance (fringe) is used. The Ramsey resonance is a phenomenon in which, when the Cs beam interacts twice with the microwave at different positions, a resonance line with a very narrow band can be obtained at a frequency $v_o$ which is the center frequency of a Cs atom. This situation is shown in FIG. 6. Since the central frequency $v_o$ of Ramsey resonance has a sharp convex curve, a frequency deviation from the center is easily phase-sensitively detected by the phase discriminator 27, and its error signal is fed back negatively to the quartz oscillator 21 through the negative feedback circuit 16, and tuned so that the Cs central frequency and the multiplied microwave frequency coincide.

Here, a microwave with a phase modulation or a frequency modulation having a rate of fm is applied to the Cs tube and the frequency deviation from the central frequency $v_o$ (the Cs Ramsey resonance) is phase-discriminated. The rate of the frequency modulation is a few 100 Hz. This state is shown in FIGS. 7A and 7B. In FIG. 7A, the microwave frequency is plotted on the horizontal axis, showing output signals with positive and negative phases, corresponding to below and above the central frequency $v_o$. That is, the deviation from the resonance line is converted into an intensity signal, and the output signal of the atomic beam tube 25 is converted into a low frequency electrical signal which is intensity modulated at fm.

When this signal and the output signal of the oscillator for phase modulator 23 are input into the phase discriminator 27 to be phase-compared, an error signal is obtained as shown in FIG. 7B. That is, depending on whether the microwave frequency deviates towards the positive or negative direction with respect to the central frequency $v_o$ of Cs Ramsey resonance, a positive or negative voltage signal can be obtained. This signal is fedback negatively to the quartz oscillator 21, thereby stabilizing the oscillation frequency of the quartz oscillator 21. This s the operation principle of the atomic oscillator.

It is well known that in the Cs atomic oscillator, a 5 MHz signal from the stabilized quartz oscillator is frequency divided and down converted to 1 Hz, and is adopted as the one second time standard.

However, in the atomic oscillator shown in FIG. 5, it is necessary to generate a microwave to be coupled into the atomic beam tube 25 using the frequency synthesizer/multiplier 24. This is because the quartz oscillator 21 cannot oscillate directly in the several GHz region. A conventional electrical synthesizer operating at several GHz to several tens of GHz uses a technique which multiplies the fundamental frequency generated from the quartz oscillator. However, this scheme is inferior in terms of its high frequency jitter characteristics because of the multiplication process through the frequency synthesizer/multiplier 24. The high frequency instability associated with the quartz oscillator itself and the jitter characteristic determines the quality of the atomic oscillator. That is, in the atomic oscillator shown in FIG. 5, slow frequency fluctuation can be completely removed by detecting deviations from the Cs resonance line, however, there have been problems in that other high frequency fluctuation components are output as they are.

As described in the previous section, the high frequency jitter characteristic of the repetition frequency of the harmonically and regeneratively mode-locked laser pulse oscillator was much better than the stability of the synthesizer. Such a highly stable oscillation circuit utilizing this scheme has not yet been proposed. However, the long-term stability (low-frequency drift) of this laser is limited by the stability of the synthesizer, which is still insufficient. By contrast, although the atomic oscillator has an excellent low-drift characteristic, there is no effective way of further suppressing of the high frequency jitter characteristics.

SUMMARY OF THE INVENTION

It is the object of the present invention to provide an atomic frequency standard laser pulse oscillator capable of providing an ultra-stable microwave output with reduced jitter better than the prior art atomic oscillator and of generating an ultra-short optical pulse train with a repetition frequency stabilized at the same level as a time standard.

The present invention incorporates an atomic frequency standard laser pulse oscillator in which the repetition frequency of a harmonically and regeneratively mode-locked laser pulse oscillator, with very little jitter at high frequency, is locked directly to the resonance frequency of various atoms.

Specifically, a self-oscillatory regeneratively mode-locked laser pulse oscillator, in which the clock signal of an integral multiple of the longitudinal mode of a laser cavity is extracted and applied to an optical modulator installed in a laser cavity. The oscillator comprises a frequency difference detection device for detecting the frequency difference between a clock signal frequency (repetition frequency of optical pulse) and a predetermined atomic resonance frequency, a cavity length tuning device for changing the length of the laser cavity so that the clock signal frequency (repetition frequency of optical pulse) and the predetermined atomic resonance frequency coincide, and a device for negatively feeding back an error signal output from the frequency difference detection device to the cavity length tuning device to generate an ultra-short optical pulse train (optical output) of a repetition frequency stabilized at the predetermined atomic resonance frequency and a clock signal (microwave output).

Therefore, by using a harmonically and regeneratively mode-locked laser pulse oscillator as the atomic oscillator in place of the prior art quartz oscillator, an ultra-stable microwave output can be obtained with less jitter than the prior art atomic oscillator. Further, when it is used as a laser pulse oscillator, an ultra-short optical pulse train can be generated with a repetition frequency stabilized to the same level as a time standard.In the atomic frequency standard laser pulse oscillator according to the present invention, by locking the repetition frequency of a low-jitter regeneratively mode-locked laser pulse oscillator at a resonance such as that of an atom, an ultra-stable microwave output (clock signal) can be obtained with less jitter than the prior art atomic oscillator, and an ultra-short optical pulse train can be generated with a repetition frequency stabilized at the same level as a time standard.

Such an ultra-stable signal source can be utilized in, for example, a time standard, the precision measurement of crustal or tidal movement, the synchronization of communication networks, the high precision phase adjustment of a phase array antenna of a radio telescope, the generation of an ultra-high frequency in the THz region by using a beat signal within the laser longitudinal modes, and as a clock signal source for space communication. It is also possible to create a new frequency chain from a microwave to an optical wave. Further, since a light source with an ultra-stable repetition frequency can be obtained, it can be utilized in the light source of an ultra-high speed optical communication system and for other types of ultra-high speed optical signal processing.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
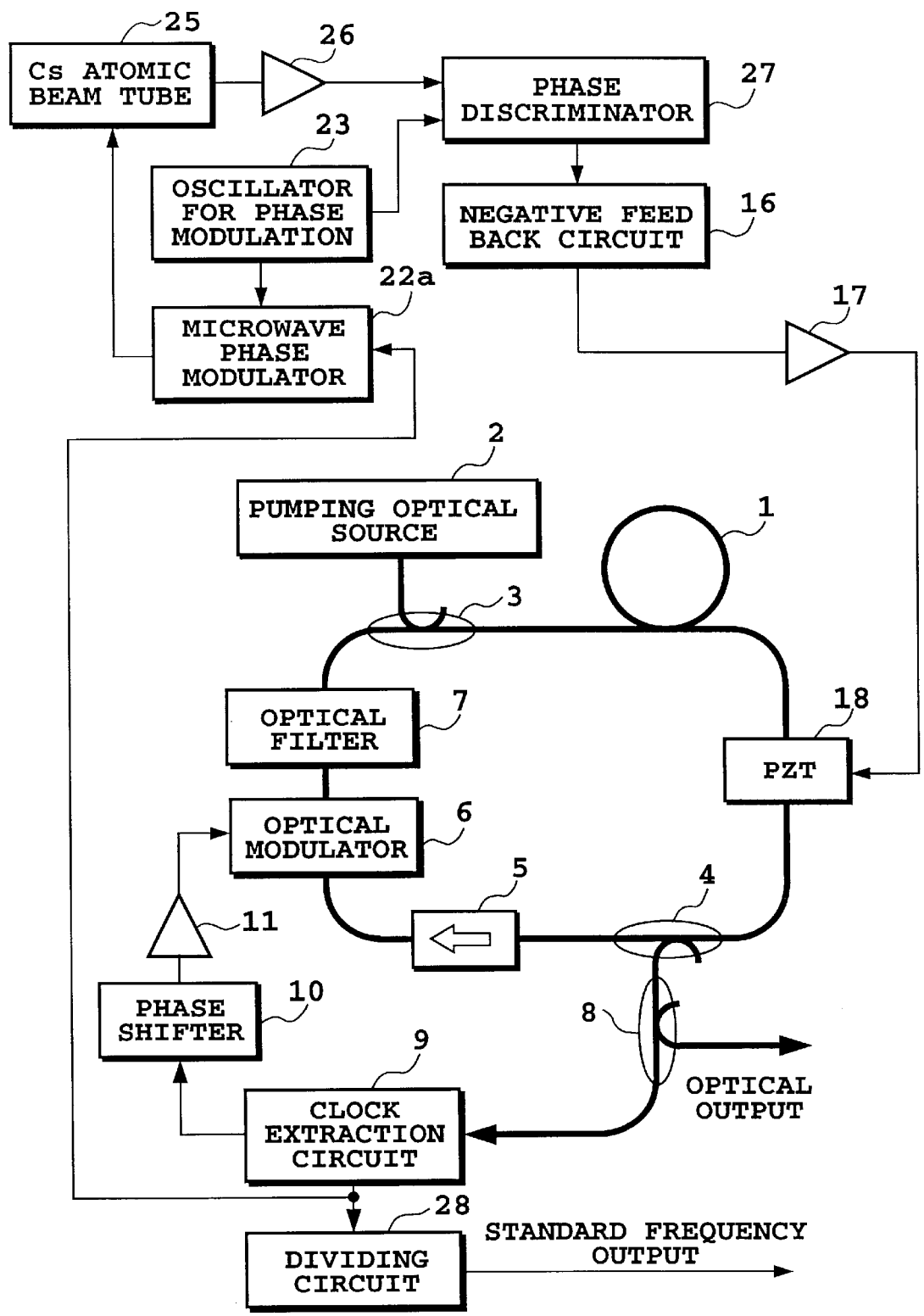
FIG. 1 is a block diagram showing an embodiment of the atomic frequency standard laser pulse oscillator according to the present invention.
Figure 3:
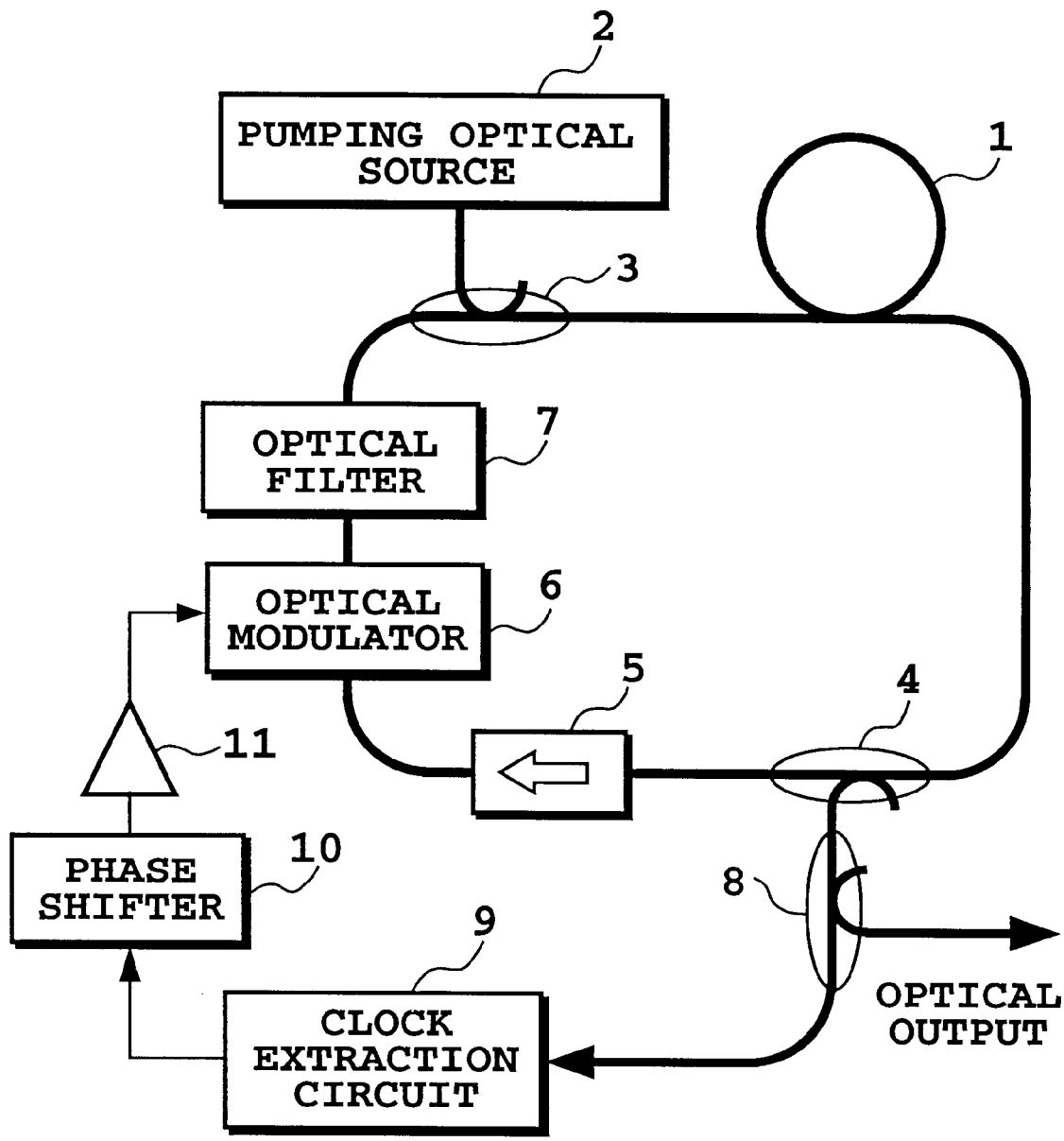
FIG. 3 is a block diagram showing the construction of the prior art laser pulse oscillator described in Japanese Patent Application Laid-open No. 8-18139 (1996)
Figure 4:
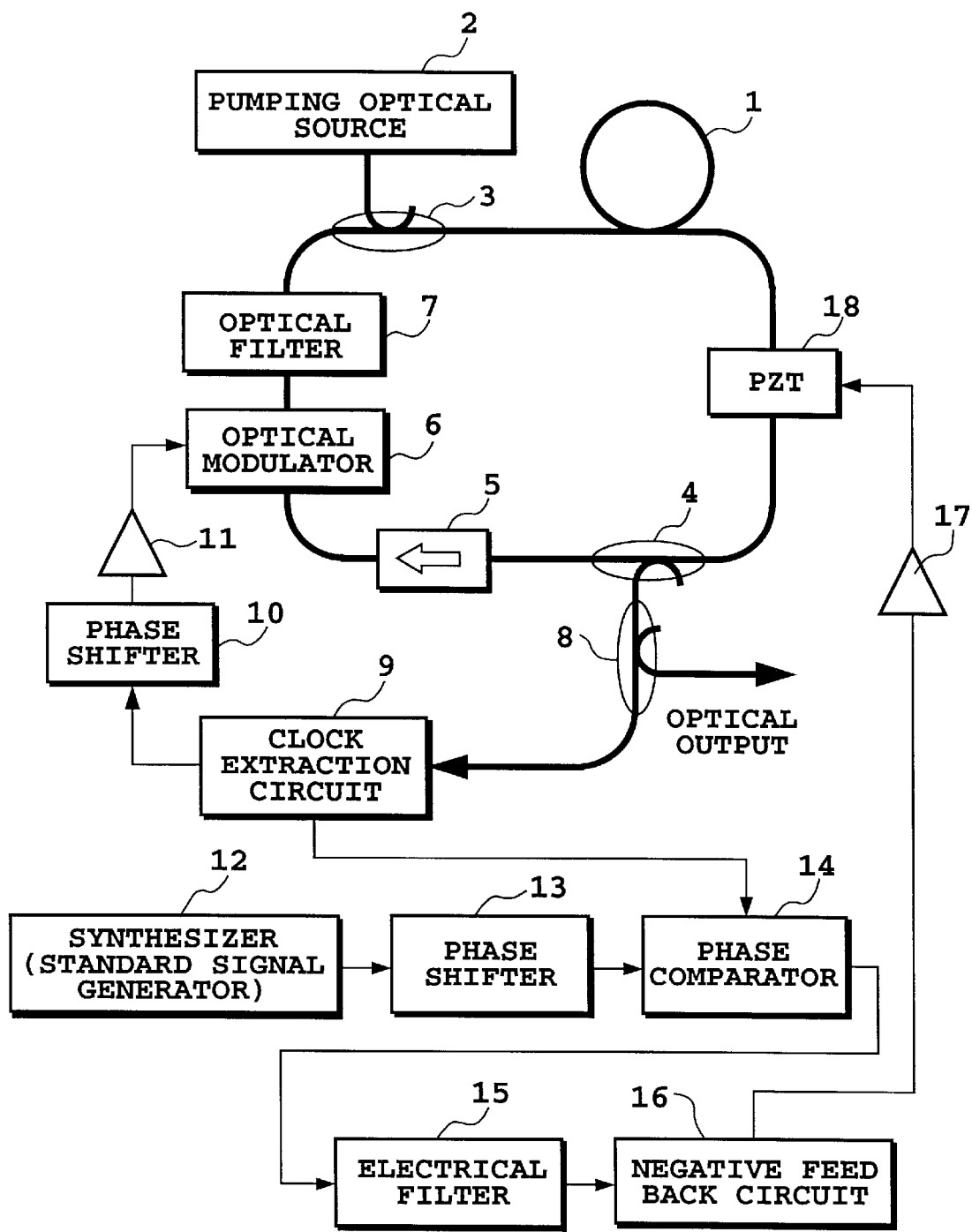
FIG. 4 is a block diagram showing the construction of the prior art laser pulse oscillator described in Japanese Patent Application Laid-open No. 10-74999 (1998)

FIG. 1 is a diagram showing an example of the atomic frequency standard laser pulse oscillator according to the present invention. In FIG. 1, a rare-earth ion doped optical fiber 1, a pumping optical source 2, an optical coupler 3, an optical beam splitter 4, an optical isolator 5, an optical modulator 6, an optical filter 7, an optical beam splitter 8, a clock extraction circuit 9, a phase shifter 10, and a microwave electrical amplifier 11 are the same in construction as the prior art self-oscillatory regeneratively mode-locked laser pulse oscillator shown in FIGS. 3 and 4. Further, in the laser cavity, a piezoelectric transducer (PZT) 18 of the same construction as that shown in FIG. 4 is installed as a cavity length tuning device for varying the cavity length.

Figure 5:
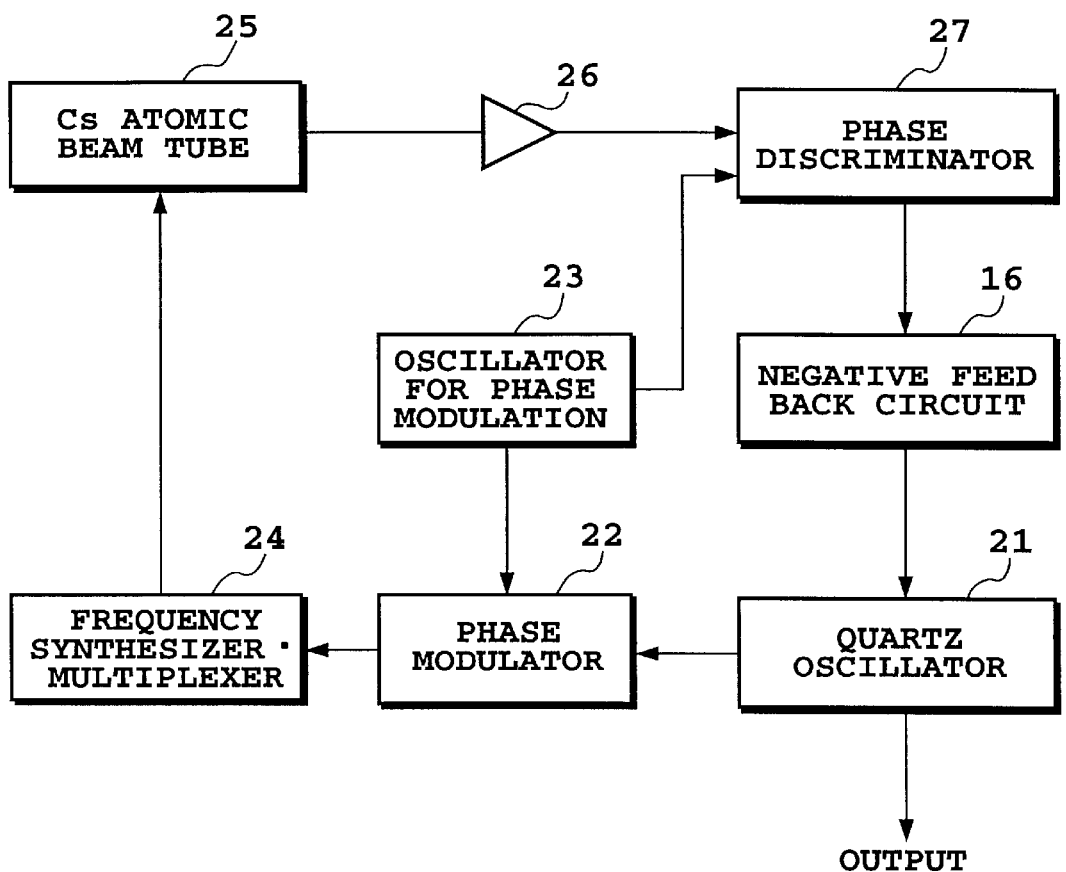
FIG. 5 is a block diagram showing the configuration of the prior art Cs atomic oscillator.
Figure 6:
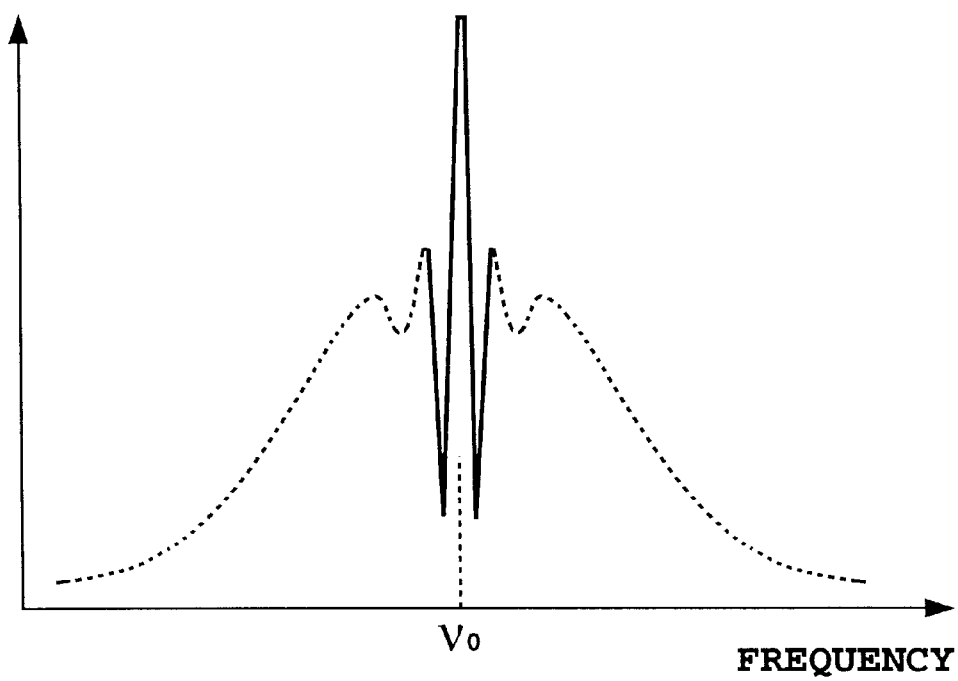
FIG. 6 is a diagram showing the Ramsey resonance used in the phase sensitive detection of a Cs atomic oscillator.
Figure 7A:
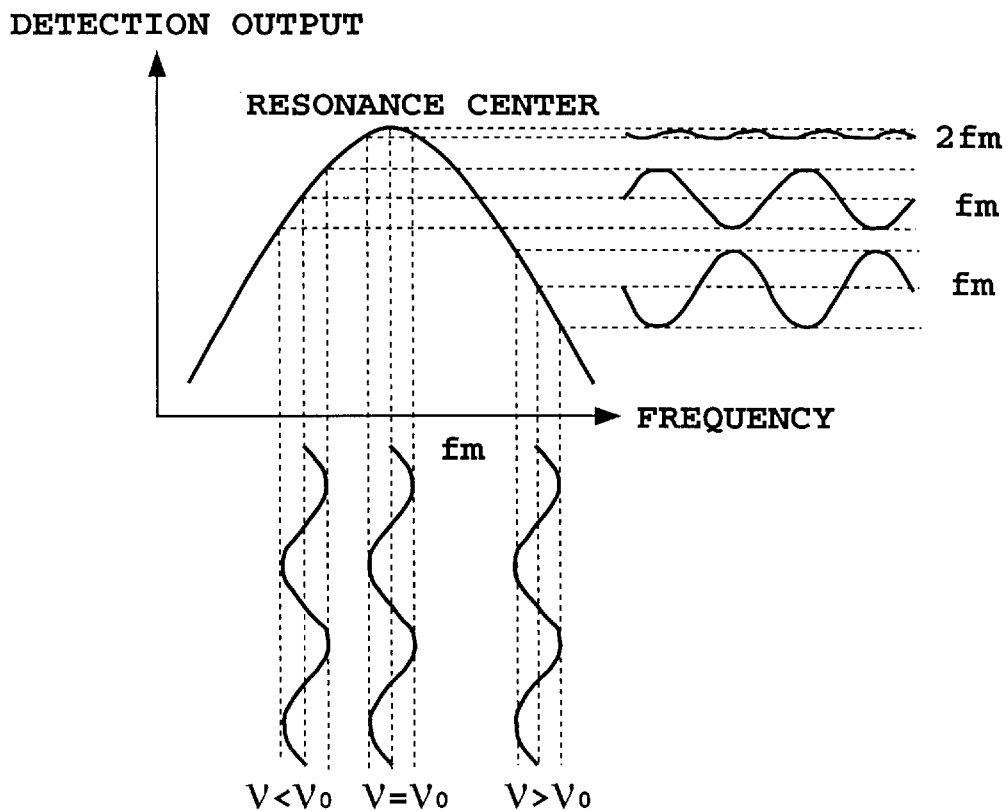
FIGS. 7A and 7B show diagrams explaining the operation principle of phase sensitive detection in an atomic oscillator.
Figure 7B:
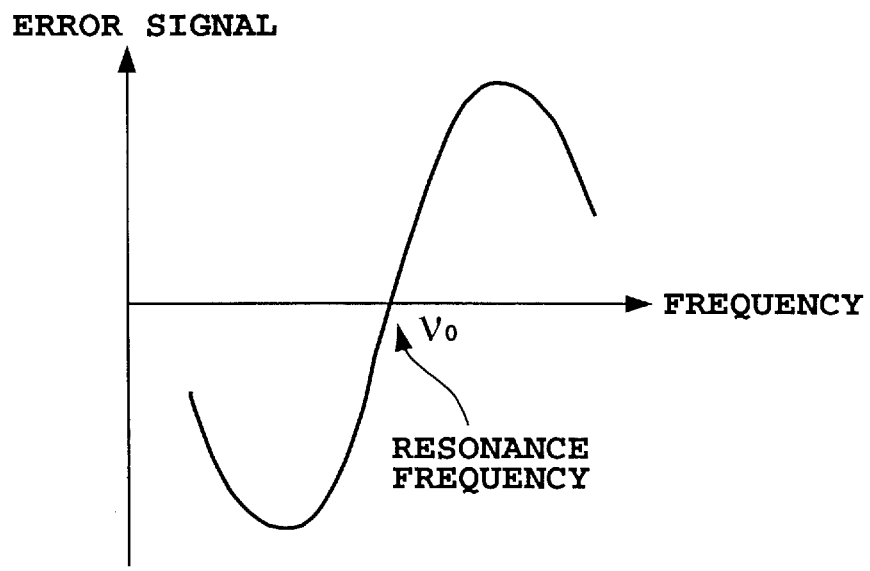

The present embodiment is characterized in that a regeneratively mode-locked laser pulse oscillator including the cavity length tuning device is used in place of the quartz oscillator 21 of the atomic oscillator shown in FIG. 5. That is, a clock signal output from the clock extraction circuit 9 is coupled into a microwave phase modulator 22a, and an error signal output from the phase discriminator 27 is fed back to the piezoelectric transducer (PZT) 18 through the negative feedback circuit 16 and the electrical amplifier 17. The oscillator for the phase modulator 23, the Cs atomic beam tube 25, the electrical amplifier 26, the phase discriminator 27, and the negative feedback circuit 16 are the same in construction as those in the atomic oscillator shown in FIG. 5.

A clock signal (output of clock extraction circuit 9) from the self-oscillatory regeneratively mode-locked laser pulse oscillator is coupled into the microwave phase modulator 22a and low frequency modulated by the oscillator for the phase modulator 23 for phase sensitive detection. Heretofore, it has been necessary to multiply the frequency of the quartz oscillator 21 using the frequency synthesizer/multiplier 24, however, the present embodiment does not require such a multiplication device since the clock signal frequency (repetition frequency of optical pulse) can be directly tuned to the atomic resonance frequency.

The output signal of the microwave phase modulator 22a is input into the Cs atomic beam tube 25, an output signal obtained by interaction with the Cs Ramsey resonance line is amplified by the electrical amplifier 26, and coupled to the phase discriminator 27. In the phase discriminator 27, a frequency deviation between the Cs Ramsey resonance frequency and the clock signal frequency (repetition frequency) of the regeneratively mode-locked laser pulse oscillator is phase-sensitively detected, and output as an error signal. This error signal is fed back to the piezoelectric transducer (PZT) 18 through the negative feedback circuit 16 and the electrical amplifier 17 to change the cavity length of the harmonically and regeneratively mode-locked laser pulse oscillator. With this operation, the repetition frequency of the harmonically and regeneratively mode-locked laser pulse oscillator can be exactly locked to the Cs Ramsey resonance frequency 9.192 GHz.

Therefore, the stability of the repetition frequency of the optical pulse output from the optical beam splitter 8 to an optical output terminal is the same as that of the Cs atomic frequency standard. This optical pulse can be demultiplexed (DEMUX) to generate a very high-precision one second interval ultra-short optical pulse train. This one second optical pulse can be utilized to provide the time to a community through an optical network. Such an optical demultiplexing circuit can be achieved using, for example, an optical Kerr switch, a nonlinear loop mirror (NOLM), a four wave mixing switch, and a cross phase modulation switch.

Further, when the atomic frequency standard laser pulse oscillator according to the present invention is used as a microwave oscillator, the clock signal output from the clock extraction circuit 9 becomes a microwave electrical output. There is no difficulty as regards the frequency division of this microwave output to one second since a frequency division circuit in the 10 to 40 GHZ region is already used in practical applications. When such a frequency dividing circuit 28 is used, an ultra-stable fundamental frequency output (one second clock) with much less jitter than the prior art atomic oscillator can be extracted. This is due to the superior low-jitter characteristic in the high Fourier frequency region of the regeneratively mode-locked laser pulse oscillator substituting for the quartz oscillator 21.

Figure 2:
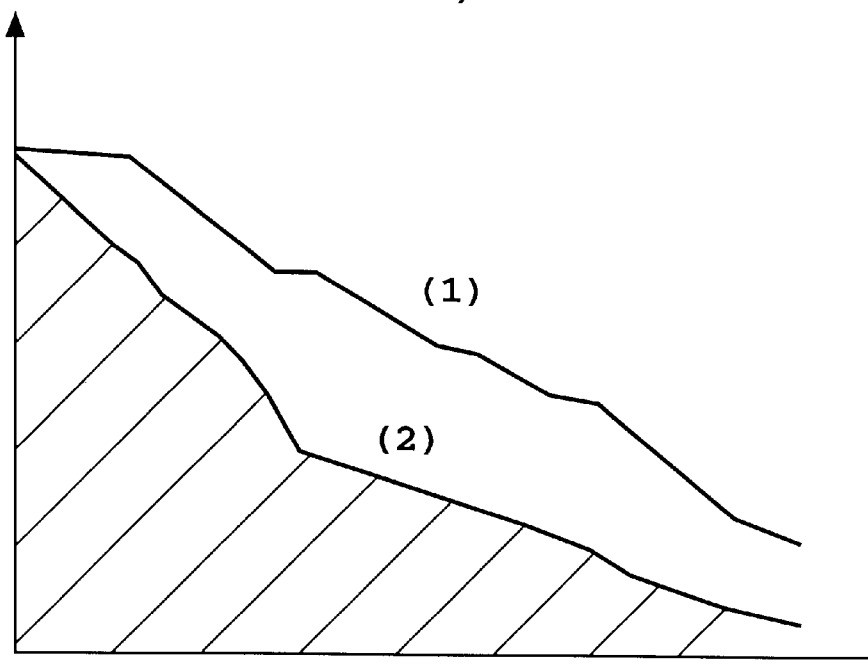
FIG. 2 is a diagram comparing the fluctuation of the oscillation frequency of the prior art atomic oscillator with the atomic frequency standard laser pulse oscillator according to the present invention.

FIG. 2 is a diagram showing an example of a comparison of the fluctuation of the oscillation frequency of the prior art atomic oscillator with that of the atomic frequency standard laser pulse oscillator according to the present invention. In the figure, the horizontal axis is an offset frequency from the oscillation frequency itself, and the vertical axis is the measured power spectral density (SSB phase noise).

In the figure, (1) shows the fluctuation in the prior art atomic oscillator and (2) shows the fluctuation in the atomic frequency standard laser oscillator according to the present invention. The fluctuation in the frequency components is greater in the prior art type. This fluctuation is noise components caused by the quartz oscillator, showing that the noise can be substantially reduced by using a regeneratively mode-locked laser pulse oscillator. The integrated value of the hatched part indicates the jitter of the oscillator, and it is advantageous that this value is smaller.

Instead of cesium Cs, rubidium Rb (6.834 GHz), hydrogen H (1.420 GHz), thallium Tl (21.310 GHz), ammonia $NH_3$ (22.834 GHz) or the like differing in resonance frequency can also be similarly utilized.

Further, erbium Er, neodymium Nd, thulium Tm and the like can be used as the rare earth element of the rare-earth ion doped optical fiber 1 forming the regeneratively mode-locked laser pulse oscillator. Moreover, instead of the fiber laser, a solid laser such as Ti— sapphire, or a semiconductor laser such as GaAs or InGaAsP can be used in the regeneratively mode-locked type.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true spirit of the invention.

What is claimed is:

1. An atomic frequency standard laser pulse oscillator, in which there is a self-oscillatory regeneratively mode-locked laser pulse oscillator for generating an optical pulse train by extracting a clock signal with an integral multiple of the longitudinal mode of a laser cavity and by applying said clock signal to an optical modulator installed in a laser cavity, is characterized as comprising:

frequency difference detection means for detecting a frequency difference between said clock signal frequency and a predetermined atomic resonance frequency;

cavity length tuning means for varying the cavity length of said laser cavity so that said clock signal frequency and said predetermined atomic resonance frequency coincide;

means for negatively feeding back an error signal output from said frequency difference detection means to said cavity length tuning means; and whereby generating an optical pulse train and a clock signal of a repetition frequency stabilized to said predetermined atomic resonance frequency.

2. The atomic frequency standard laser pulse oscillator as claimed in claim 1, wherein said predetermined atomic resonance frequency is the Ramsey resonance frequency 9.192 GHz of cesium.

3. The atomic frequency standard laser pulse oscillator as claimed in claim 1, wherein said predetermined atomic resonance frequency is the resonance frequency 6.834 GHz of rubidium.

4. The atomic frequency standard laser pulse oscillator as claimed in claim 1, wherein said predetermined atomic resonance frequency is the resonance frequency 1.420 GHz of hydrogen.

5. The atomic frequency standard laser pulse oscillator as claimed in claim 1, wherein said predetermined atomic resonance frequency is the resonance frequency 21.310 GHz of thallium.

6. The atomic frequency standard laser pulse oscillator as claimed in claim 1, wherein said predetermined atomic resonance frequency is the resonance frequency 22.834 GHz of ammonia.

7. The atomic frequency standard laser pulse oscillator as claimed in claim 1, comprising an optical demultiplexing circuit for demultiplexing said optical pulse train stabilized to said predetermined atomic resonance frequency and outputting an optical pulse train at a given time standard.

8. The atomic frequency standard laser pulse oscillator as claimed in claim 1, comprising a frequency dividing circuit for dividing said clock signal stabilized to said predetermined atomic resonance frequency and outputting a fixed frequency standard signal at a given time standard.

* * * * *